US010985597B2

(12) United States Patent
Wilson

(10) Patent No.: US 10,985,597 B2
(45) Date of Patent: Apr. 20, 2021

(54) EMERGENCY LIGHTING CONVERTER

(71) Applicant: TRIDONIC GMBH & CO KG, Dornbirn (AT)

(72) Inventor: Ian Wilson, Sunderland (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/481,538

(22) PCT Filed: Feb. 26, 2018

(86) PCT No.: PCT/EP2018/054661
§ 371 (c)(1),
(2) Date: Jul. 29, 2019

(87) PCT Pub. No.: WO2018/158192
PCT Pub. Date: Sep. 7, 2018

(65) Prior Publication Data
US 2020/0028378 A1 Jan. 23, 2020

(30) Foreign Application Priority Data
Mar. 1, 2017 (GB) .................. 1703637.7

(51) Int. Cl.
*H02J 7/00* (2006.01)
*H02J 9/02* (2006.01)
(Continued)

(52) U.S. Cl.
CPC .............. *H02J 9/02* (2013.01); *H02J 7/0003* (2013.01); *H02J 7/0068* (2013.01); *H05B 45/00* (2020.01)

(58) Field of Classification Search
CPC .... H02J 7/0003; H02J 7/00038; H02J 7/0068; H02J 9/02; H02J 9/065; H05B 45/00; H05B 45/37; H05B 47/105; Y02B 20/44
(Continued)

(56) References Cited

U.S. PATENT DOCUMENTS 5,237,257 A * 8/1993 Johnson ............ H04W 52/0277
320/106
2013/0147351 A1* 6/2013 Trainor .................. G01R 31/44
315/86
2016/0028130 A1* 1/2016 Dvorkin .............. H01M 10/482
429/90

FOREIGN PATENT DOCUMENTS

CN          2918972        7/2007
CN        203349134       12/2013
(Continued)

OTHER PUBLICATIONS

GB search report dated Aug. 30, 2017 in priority application GB1703637.7.
(Continued)

Primary Examiner — Toan T Vu
(74) Attorney, Agent, or Firm — Andrus Intellectual Property Law

(57) ABSTRACT

The invention is in the field of emergency lighting devices and power supply of emergency lighting devices. A LED converter for an emergency lighting unit comprises a LED driver for supplying a current to a LED lighting device, an energy storage interface for connecting an energy storage device, a charging circuit for charging the energy storage, and a control circuit. The energy storage interface is configured to connect at least two different types of energy storage devices. The charging circuit sets at least one energy storage management parameter according to the type of energy storage device connected by the energy storage
(Continued)

interface. The control circuit determines the type of energy storage device connected by the energy storage interface and controls the charging circuit to set the energy storage management parameter according to the determined type of energy storage device.

8 Claims, 3 Drawing Sheets

(51) Int. Cl.
*H05B 33/08* (2020.01)
*H05B 45/00* (2020.01)

(58) Field of Classification Search
USPC .......................................... 307/20, 23, 25, 66
See application file for complete search history.

(56) References Cited

FOREIGN PATENT DOCUMENTS

| | | |
|---|---|---|
| EP | 0 394 074 | 10/1990 |
| EP | 1 202 429 | 5/2002 |
| GB | 2485659 | 5/2012 |

OTHER PUBLICATIONS

PCT International Search Report dated Jun. 6, 2018 in parent PCT application PCT/EP2018/054661.

\* cited by examiner

EMERGENCY LIGHTING CONVERTER

CROSS REFERENCE TO RELATED APPLICATIONS

The present application is the U.S. national stage application of international application PCT/EP2018/054661 filed Feb. 26, 2018, which international application was published on Sep. 7, 2018 as International Publication WO 2018/158192 A1. The international application claims priority to Great Britain Patent Application 1703637.7 filed Mar. 1, 2017.

FIELD OF THE INVENTION

The invention is in the field of emergency lighting devices and power supply of emergency lighting devices. In particular, the invention relates to a LED converter and a method of operating a LED converter.

BACKGROUND OF THE INVENTION

Emergency lighting devices actuate light emitting means, for example including light emitting diodes (LED) under circumstances of an emergency, e.g. when a mains supply fails. Emergency lighting devices typically include an LED driver (LED converter) for driving the lighting means, either from a mains supply or, in case of a mains supply failure, from an energy storage device.

The energy storage device is selected to provide the emergency lighting device for a predefined time period, for example for 2 or 3 hours, with electric energy to actuate the lighting means to emit enough light to maintain a minimum light level, for example to aid evacuation of a building.

Therefore, emergency lighting devices are often arranged in public buildings and are accordingly installed in large numbers over the whole building. Costs for installing a great number of emergency lighting devices are accordingly high, and maintenance, in particular when each individual emergency lighting device is equipped with an energy storage device with a limited lifetime, also involves costs.

As energy storage device for an emergency lighting device usually a rechargeable battery is used. The stored electric energy in the energy storage device is to be held above a minimum level. Usually the energy storage device is a battery pack with a number of rechargeable battery cells. The emergency lighting device includes a charging means in order to recharge the energy storage device in order to maintain the stored electric energy above the minimum level.

Battery cells are available based on different kinds of technology, thus different types of energy storage devices may be used. The employed battery chemistry includes for example NiCd (Nickel-Cadmium battery, also NiCad-battery), NiMH (Nickel-metal hydride battery) or Li-ion (Lithium-ion battery) based technology. Suitability of an algorithm for charging a battery cell depends on the employed battery chemistry. In FIG. 2, electric charging characteristics (charging voltage, charging current) over time are depicted for some known battery technologies. From FIG. 2 it becomes immediately apparent that the characteristic parameters for charging, for example for a Li-ion battery, are fundamentally different from charging parameters for charging NiCd based battery. If a Li-ion battery is intended to replace a NiCd battery, at least the charging parameters of a charging means have to be changed, for example by executing settings via switches implemented in hardware or software in the emergency lighting device.

Alternatively, an emergency lighting device may be only designed for use with a pre-set type of battery, for example a Li-ion battery. This increases the number of variants of an emergency lighting device for a manufacturer, and restricts a user of an emergency lighting system to a specific type of battery chemistry.

Even more severe, using a unsuitable charging algorithm with a rechargeable battery may adversely affect battery lifetime, but may also generate a safety risk, for example when using a constant voltage/constant current charging algorithm in conjunction with a Li-ion battery.

SUMMARY OF THE INVENTION

Hence, the technical problem of using emergency lighting devices with one energy storage devices selectable from a plurality of different types of battery chemistry is to be addressed.

The LED converter for an emergency lighting unit according to claim 1 and the corresponding method of operating a LED converter provide a solution to the technical problem.

The invention relates to an LED converter for an emergency lighting unit. The LED converter comprises an LED driver configured to supply a current to a LED lighting device, an energy storage interface configured to connect an energy storage device, a charging circuit configured to charge the energy storage device and a control circuit. The energy storage interface is configured to connect to at least two different types of energy storage devices. Further, the charging circuit is configured to set at least one energy storage management parameter according to the determined type of energy storage device connected by the energy storage interface. The control circuit is configured to determine the type of energy storage device connected by the energy storage interface and to control the charging circuit to set the energy storage management parameter according to the determined type of energy storage device.

An energy storage management parameter is a technical parameter that is characteristic for charging and/or discharging of an energy storage device such as a (rechargeable) battery. The energy storage parameter may be for example an identifier for a specific charging algorithm.

The emergency LED converter can operate reliably with energy storage devices of different types of energy storage devices, for example having a different battery chemistry. Therefore, the number of different variants of essentially same LED converters can be advantageously low, improving the logistics of the manufacturer of the LED converter.

Simultaneously a user can replace energy storage devices reaching an end of their lifetime with a new energy storage device, which has another battery chemistry than the energy storage device being replaced without having to newly set up a charging algorithm by changing settings, for example with a switch, a DIP-switch, jumper or the like on the emergency LED converter. The lifespan of the energy storage device with the LED converter reliably reaches its envisaged length, as the energy storage device is used in conjunction with a suitable charging algorithm.

The dependent claims show further advantageous embodiments of the LED converter.

An advantageous LED converter of an embodiment comprises the energy storage interface configured to connect a temperature sensor of the energy storage device. The control circuit is configured to determine absence, presence and/or an electrical characteristic of the temperature sensor for determining the type of energy storage device connected by the energy storage interface.

By using a temperature sensor, for example a simple thermistor which is connected by the energy storage interface by the control circuit of the LED converter, the different types of energy storage devices may differ simply by the presence or absence of the temperature sensor. The temperature sensor may itself simultaneously fulfil the sensor task for acquiring an energy storage temperature for a temperature guard function or the charging algorithm if it requires temperature information.

The invention preferably relates to an emergency lighting unit, wherein the charging circuit is configured to determine an absence of the temperature sensor in the energy storage device connected by the energy storage interface.

The control circuit determines that there is no temperature sensor in the energy storage device connected via the energy storage interface and the control circuit concludes based thereon that this indicates an energy storage device of a distinctive type. Hence at least two types of energy storage devices can be discriminated by the absence or presence of a temperature sensor in a simple and efficient manner.

The LED converter of an embodiment includes the control circuit configured to determine the electrical characteristic of the temperature sensor being presence of the temperature sensor and/or to measure a value of the electrical characteristic of the temperature sensor.

By simply measuring an electric characteristic, for example a resistance of the temperature sensor, for example a thermistor, the discrimination between different types of energy storage devices is easily accomplished without requiring specific logic circuitry or a characteristic mechanic design of the energy storage device depending on the cell chemistry of the energy storage device. A cost efficient solution for enabling the LED converter to distinguish between different types of energy storage devices becomes available.

The LED converter for an emergency lighting unit according to a further advantageous embodiment has the energy storage management parameter forming part of one of at least two sets of energy storage management parameters, which include at least one of charging parameters, discharging parameters and failure parameters.

Determining the type of a connected energy storage device is advantageous when an entire set of energy storage management parameters is to be selected and set for energy management processes during operation of the energy storage device. Operations such as charging the energy storage device, retrieving electric energy from the energy storage device, or the handling of a failure of the energy storage device can be performed taking account of the specific type of energy storage device, in particular of a cell chemistry applied in the energy storage device. A lifespan of the energy storage device can be expected to be lengthened by using a specifically adapted set of parameters according to the determined type of energy storage. Life cycle cost of the LED converter are therefore reduced, while usability of the LED converter with different types of energy storage is increased.

The LED converter for an emergency lighting unit according to an advantageous embodiment comprises a memory for storing at least two sets of energy storage management parameters.

A memory for storing energy storage management parameters offers the possibility to change the sets of energy storage parameters easily when new battery technologies are available and new energy storage management parameters become necessary to use the full capability of the battery technology.

An energy storage device for an LED converter for an emergency lighting unit according to the invention is an energy storage device comprising a temperature sensor and an external energy storage interface for electrically interfacing the temperature sensor.

An advantageous energy storage device includes as the temperature sensor a thermistor, in particular a NTC resistor or PTC resistor. A thermistor, whose resistance value depends on the temperature, offers a cost effective solution for simultaneously providing a value depending on a sensed ambient temperature in the energy sore device on one hand and on the other hand, a resistance value range which is pre-set according to the type of the energy storage chemistry employed in the energy storage device. The additional costs for the energy storage device are small, while simultaneously the tasks of communicating the type of the energy storage device and a temperature of the energy storage device can be fulfilled.

The invention further solves the technical problem by a method of operating an LED converter for an emergency lighting unit as described above. The type of energy storage device connected to the converter by the energy storage interface is determined, and at least one energy storage management parameter is set according to the determined type of energy storage device by the control circuit.

According to a preferred embodiment, the control circuit determines absence, presence and/or an electrical characteristic of the temperature sensor to discriminate between different types of energy storage device that may be connected by the energy storage interface.

In case a lack of the temperature sensor is determined in the step of determining, a specific type of energy storage device is determined. The specific type of energy storage device may in a particular be a NiMH or NiCd type energy storage device.

An embodiment of the method of operating a LED converter includes the control circuit determining in the step of determining, the presence of the temperature sensor and/or measures a value of the electrical characteristic of the temperature sensor.

BRIEF DESCRIPTION OF THE DRAWINGS

Embodiments of the invention are described in the figures, in which.

In the figures, like reference numbers indicate identical or functionally corresponding elements.

DETAILED DESCRIPTION

Figure 1:
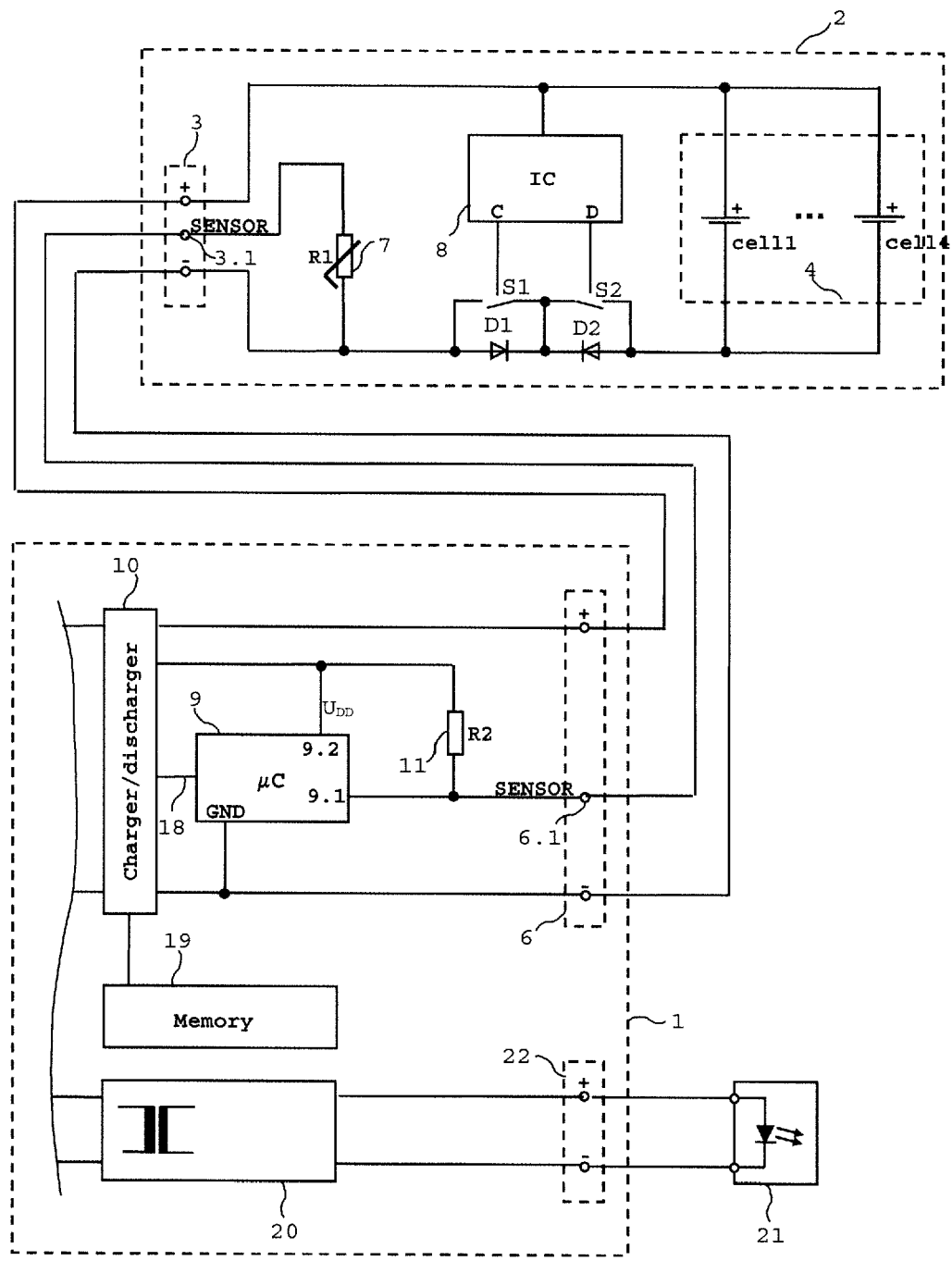
FIG. 1 shows a simplified block diagram of parts of an LED converter with an energy storage device according to an embodiment.

In FIG. 1, a simplified block diagram of parts of an LED converter 1, for example for an emergency lighting system with an energy storage device 2 according to an embodiment is depicted.

The LED converter 1 comprises an LED driver 20 for generating an LED drive current. The LED drive current is output via light device interface 22 to an LED lighting device 21. The LED lighting device 21 is fed with the LED light current and emits light from one or more LED.

The LED driver 21 is fed from mains supply in case of normal operations when mains supply is available. In case of a mains failure or malfunction, the LED driver 20 is provided with electric energy from the energy storage device 2 via the charger/discharger circuitry, which is referenced as charger circuit 10 further on. For the invention the structure of the internal charger circuit 10, the LED driver 20, the LED interface 22 and the LED lighting device 22 is not essential for understanding the invention and may be of any known structure used in conjunction with LED converters 1 for emergency lighting applications. The charger circuit 10 must only be capable to adapt its settings on the basis of an input signal.

Emergency lighting and standard lighting may for example share components. For example, the same LED lighting device 22 or the same LED driving device 20 may be used for a conventional lighting mode as well as for the emergency lighting mode (maintained lighting mode).

The energy storage device 2 comprises an external interface 3 including the necessary means for providing a mechanical and an electrical interface to the LED converter 1. In particular the external interface 3 comprises one or more electrical connectors for connecting the power supply lines, shown in FIG. 1 as a first positive connecting line (+) and a second negative connecting line (−) for connecting an anode and a cathode of the one or more battery cells 4 via the external interface 3 and an electrical connecting cable 5 to an energy storage interface 6 of the LED converter 1. The external interface 3 further includes at least one electrical connection 3.1 for connecting a temperature sensor 7 via the electrical connecting cable 5 to the energy storage interface 6 of the LED converter 1.

The energy storage device 2 of FIG. 1 further includes at least one integrated circuit (IC) 8 for controlling charging and discharging the at least one cell 4 via switches S1, S2 and diodes D1, D2 in order to protect the energy storage device 2. The circuit of the energy storage device 2 shown in FIG. 1 is an exemplary circuit topology typical for a Li-ion type energy storage device 2.

In case of a NiMH or NiCd type energy storage device 2, the temperature sensor (thermal sensor) 7 is not required and accordingly, the sensor connection 3.1 of the external energy storage interface, for example one pole in a 3-pole keyed connector, is not used, for example open. Thus a suitably adapted LED converter 1 can detect a difference between different types of energy storage devices 2, in this case a NiMH or NiCd type energy storage device 2 on the one hand and a L-ion type energy storage device 2 on the other hand.

The inventive energy storage device 2 comprises the temperature sensor 7, in particular a thermistor as depicted in FIG. 1 connected between the electrical sensor connection 3.1 and the negative connection "−". This specific circuit arrangement is only one of plural possibilities of arranging the temperature sensor 7.

The temperature sensor 7 may be a NTC or PTC resistor. A NTC resistor is a resistor whose resistance value decreases with increasing temperature. A PTC resistor is a resistor whose resistance value increases with increasing temperature.

The energy storage device 2 can be arranged in a separate mechanical housing or be integrated in a housing of the LED converter 1.

The LED converter 1 comprises an electrical connecting cable 5 for connecting the energy storage interface 6 to the external interface 3 of the energy storage device 2.

The LED converter 1 comprises a control circuit 9, for example a microcontroller or application specific integrated circuit (ASIC). The control circuit 9 controls a charging circuit 10 for charging the energy storage device 2. Further, the control circuit 9 determines a type of the energy storage device 2 connected via the interface 6 to the LED converter 1.

In the depicted embodiment of the LED converter 1, the sensor connection 6.1 of the energy storage interface 6 is connected to an input 9.1 of the control circuit 9. A resistor R2 11 is connected between the sensor connection 6.1 and a supply voltage $V_{DD}$ provided to a supply voltage input 9.2 of the control circuit 9. The input 9.1 is therefore on an electrical potential determined by a voltage divider comprising the resistance R2 and the temperature sensor 7 when neglecting the resistances of the cable 5 and the connections 3.1, 6.1. Therefore the depicted circuit enables the control circuit 9 to determine if a thermistor 7 is connected via the cable 5 between the sensor connection 3.1 of the energy storage interface 3 and the negative line "−" of the external interface 3 from the electric potential at the input 9.1. By determining if the thermistor 7 is connected, a first type of the energy storage device 2, or if no thermistor is connected, a second type of energy storage device 2 is identified. Discrimination between two types of energy storage devices 2 is therefore possible.

For example, the first type of energy storage device 2 with a temperature sensor 7 present can be a Li-ion cell type energy storage device 2. In this example, the second type of energy storage device 2 may be a NiMH cell type energy storage device 2. This is particularly advantageous, as in case of the cell chemistry of the energy storage device 2 basing on the Li-ion type cell chemistry, supervising and using the cell temperature offers improved charging/discharging characteristics and enhances safety of operation of the energy storage device 2. The temperature sensor 7 of the energy storage device 2 with Li-ion technology combines the effects of identifying the cell technology as well as providing the sensor function of monitoring the device temperature.

The control circuit 9 controls the charger circuit 10 via a charger control line 18 to read a set of energy storage management parameters from a memory 20. The memory 19 can store two or more sets of energy storage management parameters, each associated with at least one type of energy storage device 2. Each set of energy management parameters comprises at least one energy storage management parameter.

Figure 2:
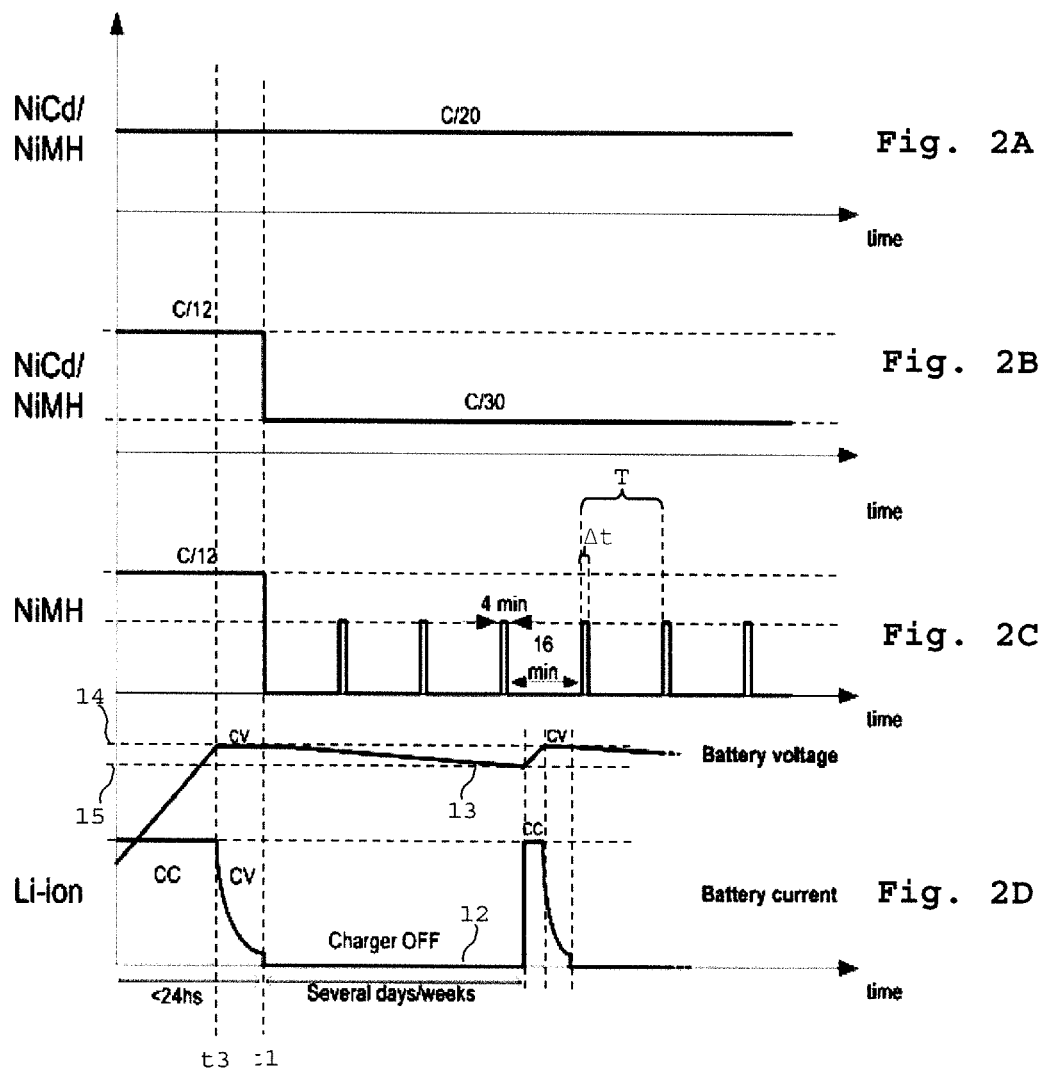
FIG. 2 shows charging characteristics of different charging algorithms for respective different types of battery chemistry.

In FIG. 2, different types of cell chemistry of the energy storage device 2 are discussed with respect to their charging characteristics.

In FIG. 2A and FIG. 2B, characteristic different charging algorithms for NiCd and NiMH type battery cells are shown.

FIG. 2A, charging of the energy storage device 2 and its cell 4 is performed by applying a permanent, constant charging current independent of the time t during charging. FIG. 2A is accordingly an example of a permanent charging algorithm.

FIG. 2B, charging of the energy storage device 2 and its cell 4 is performed by applying a permanent, multilevel charging current with for a first time period t1 providing a first charging current level, for a second time period t2 providing a second charging current level during charging of the energy storage device 2. The second charging current level is smaller than the first charging current level. The first time period t1 is usually smaller than one day, the second time period typically several days or even weeks long. FIG. 2A is accordingly an example of a multi-level permanent charging algorithm.

In FIG. 2C, a typical battery voltage and battery current for a charging algorithm for a NiMH type battery cell are shown. The intermittent type charging algorithm applies a permanent constant charging current in the first time period $t_1$ with the first charging current level. During the second time period $t_2$, a second charging current level is applied with current pulses of a duration of Δt and with a pulse period of T. In the depicted example in FIG. 2C, the time duration Δt is selected for 4 minutes, and the time period T to about 16 minutes.

In FIG. 2D, a typical battery voltage and battery current for a charging algorithm for a Li-ion type battery cells is shown. In case of the Li-ion type cell, a charge current 12 is applied to charge the cell 4 until the cell voltage reaches a predetermined cell voltage level 14 representing an upper cell voltage threshold at a time $t_3$. During the remainder of the time period until the time $t_1$ is reached, the charging current drops to a second charging current level and the predetermined cell voltage of the energy storage device 2 of the Li-ion type is maintained at the predetermined cell voltage level 14. When the time $t_1$ is elapsed, the charging current is set to zero and the cell voltage of the cell 4 slowly drops until over a time of several days or weeks, a second predetermined cell voltage 15 representing a lower cell voltage threshold is reached. Now the charging circuit 10 is controlled by the control circuit 9 to supply a charging current 12, preferable of the same current level as during the first time period up to the time $t_3$. The cell 4 is charged by the fed electric energy and the cell voltage 13 increases up to the predetermined cell voltage level 14 representing the upper cell voltage threshold. During the remainder of the time period until the time $t_1$ is reached, the charging current decreases to the second charging current level and the predetermined cell voltage of the energy storage device 2 of the Li-ion type is maintained at the predetermined cell voltage level 14. After a time $t_2$ is reached, the charging current is set to zero and the cell voltage of the cell 4 slowly drops until the second predetermined cell voltage 15 representing the lower cell voltage threshold is reached again. This process of charging and discharging occurs repeatedly.

Applying an unsuited charging algorithm for a specific cell chemistry of the cell 4 of the energy storage device 2 may seriously affect the battery lifespan, and—in particular in case of the Li-ion type cell—presents a serious security risk. Accordingly, the invention offers an increase in usability of the LED converter 1 with reduced lifetime costs and improved security against malfunction and misuse by providing a simple and efficient method of increasing the numbers of cell chemistries to be used with one LED converter 1 without requiring a user to actively select and set a suitable charging algorithm.

The above discussed charging parameters are to be understood as examples for some cell chemistries and some cell chemistry dependent energy storage management parameters. The invention may be used with other known and even future cell chemistries for the energy storage device 2. Charging parameters such as a load current, a load voltage, different voltage or current levels or different time periods may be set as energy storage management parameters in dependence of a determined cell type.

The energy storage management parameters may include selecting a suitable battery management algorithm, for example constant current algorithm, permanent or intermittent charge algorithm or permanent or intermittent charge and constant current followed by a constant voltage particularly suitable Li-ion cell chemistry.

The energy storage management parameter may include selecting a suitable charging methodology, for example charge termination or charge reduction based upon a timed algorithm such as NiCd. In case of NiMH, charging reduction based on a negative dV/dt may be set as energy storage parameter with respect to the charge methodology. In Li-ion type cells chemistry, voltage charging termination may be set as charging methodology.

The energy storage management parameters may include selecting a suitable discharge current, for example a higher discharge current for the mostly in parallel connected Li-ion cells 4 instead of the NiCd or NiMH cells 4 usually arranged in series.

The energy storage management parameters may include failure parameters and thresholds in dependence of the respective type of energy storage device 2 and its cell chemistry. The energy storage management parameters may include in this respect at least one of a gassing voltage level threshold, an open circuit battery threshold and a minimum battery voltage level for a fully charged energy storage device 2.

The energy storage management parameters may include end of charge limit, in particular a low voltage battery cut off limit (LVBCO) in dependence of the respective type of energy storage device 2.

The energy storage management parameter may enable an energy storage device communication function for communicating with the LED converter 1, in particular in case of a Li-ion type energy storage device 2 which may include an integrated circuit for implementing some battery pack intelligence functions.

The energy storage management parameters may include a pre-recorded parameter set applicable to the specific energy storage device 2 with its determined cell chemistry.

Figure 3:
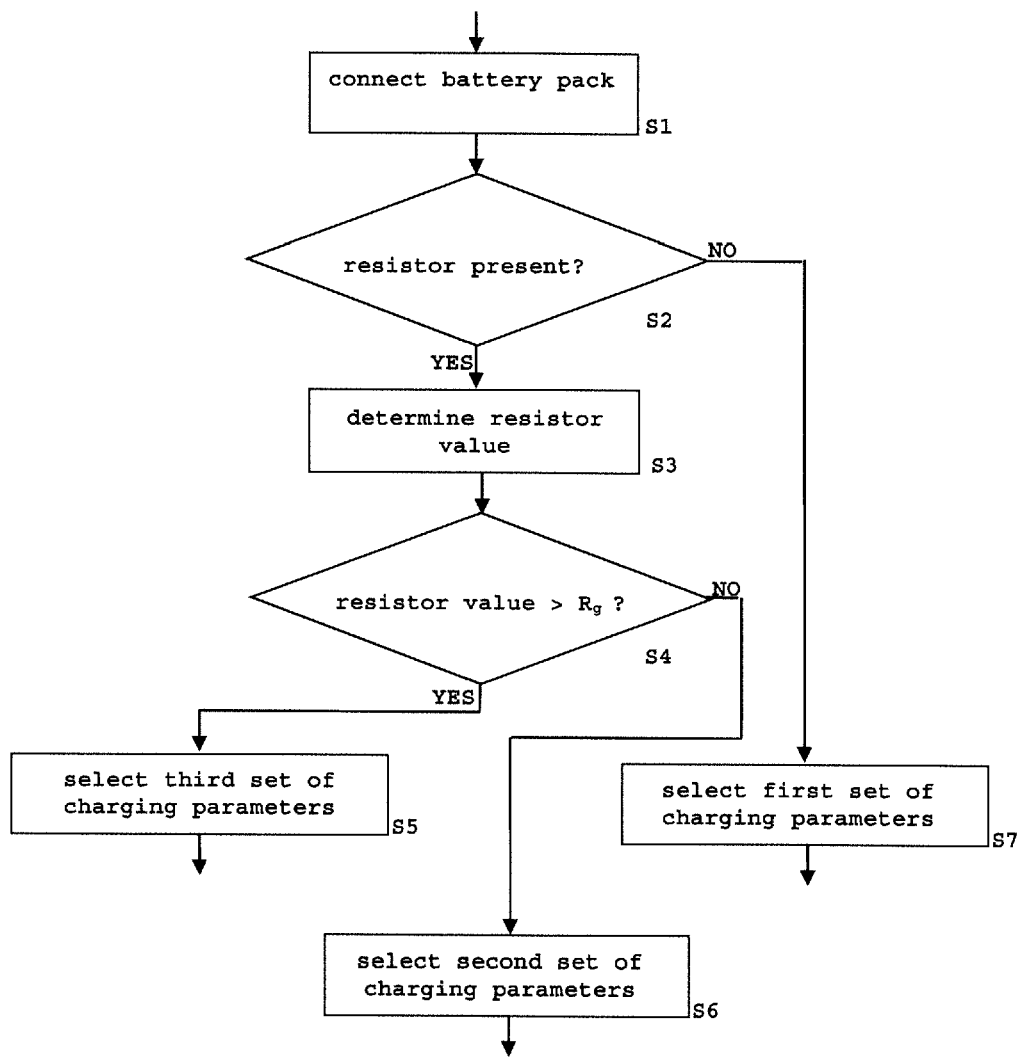
FIG. 3 shows a flowchart for a method for operating a LED converter according to an embodiment.

In FIG. 3, a method of operating a LED converter 1 for an emergency lighting unit is shown in a simplified flow chart. The LED converter comprises a LED driver 20 configured to supply a current to a LED lighting device 22, an energy storage interface 6 configured to connect an energy storage device 2, a charging circuit 10 configured to charge the energy storage device 2 and a control circuit 9.

In a first step S1 the energy storage device 2, for example a dismountable battery pack, is connected with an electrical connection cable 5 between the external interface 3 of the energy storage device 2 and the energy storage interface 6 of the LED converter 1 to the LED converter 1.

The method comprises a subsequent step S2, for example by executing a respective program by the control circuit 9, in which it is determined, if the temperature sensor 7, in particular a thermistor, is present in the energy storage device 2. If a temperature sensor 7 is not found to be present in the energy storage device 2, the method proceeds to step S7.

In step S7 the method determines the type of the energy storage device 2 to be a first type and accordingly selects and sets a first set of charging parameters adapted to the first type of energy storage devices 2.

In case it is determined in step S2, that a temperature sensor 7 is indeed present in the energy storage device 2, the method proceeds to step S3 and determines the resistor value of the temperature sensor 7.

In step S4 succeeding to step S3, the determined resistor value is compared to a threshold $R_g$. Is the determined resistor value smaller than the threshold $R_g$ Is in step S4, the method proceeds to step S6 and determines the type of the energy storage device 2 is a second type and accordingly selects and sets a second set of charging parameters adapted to the second type of energy storage devices 2.

Is the determined resistor value greater than the threshold $R_g$ in step S4, the method proceeds to step S5 and determines the type of the energy storage device 2 to be a third type and accordingly selects and sets a third set of charging parameters adapted to the third type of energy storage devices 2.

The method shown in FIG. 3 refers to three types of energy storage devices 2. It is apparent, that the invention also includes embodiments with only two types of energy storage devices 2, which are for example distinguishable by the presence or absence of the temperature sensor 7 in step S2, or a larger number of different types of energy storage devices 2.

The method of FIG. 3 is run every time an energy storage device 2 is connected to the LED converter 1. Alternatively or additionally, the inventive method is also to be performed continuously and/or intermittently in order to detect changes concerning the connected energy storage device 2 and its respective type. For example the steps S2 to S7 may be executed at regular intervals in the control circuit 9 in order to solve the technical problem in an advantageous manner.

The inventive method to determine the type of energy storage device may use in addition a step of measurement of a characteristic parameter of the battery itself. Such characteristic parameter may be the open circuit battery voltage or the inner resistance of the battery. Such determination of one or more characteristic parameters of the battery may be used to further differentiate between different battery types or to verify whether the type of battery has been determined correctly.

What is claimed is:

1. An LED converter for an emergency lighting unit, comprising
    an LED driver configured to supply a current to an LED lighting device;
    an energy storage interface configured to connect the LED converter to an energy storage device, said energy storage interface having a positive electrical connector, a negative electrical connector and a sensor connector, wherein said energy storage device is one of at least two different types comprising an NiMH battery and at least one other type of battery;
    memory that stores at least two sets of energy storage management parameters, each set of energy storage management parameters being associated with and including charging parameters for one of the types of energy storage devices to which the energy storage interface is configured to be connected;
    a charging circuit configured to charge the connected energy storage device according to one of the respective sets of energy storage management parameters stored in memory;
    a control circuit that is electrically connected to the sensor connector of the energy storage interface, is configured to identify the type of energy storage device connected to the energy storage interface, and is further configured to control the charging circuit in accordance with the energy storage management parameters in memory associated with the identified type of energy storage device;
    wherein the control circuit detects whether a thermistor is electrically connected to the sensor connector of the energy storage interface, and when absent determines that the energy storage device is an NiMH battery, and when present determines that the energy storage device is another type of battery and extracts a temperature value from the thermistor to measure the temperature of the energy storage device.

2. The LED converter for an emergency lighting unit according to claim 1, wherein
    the energy storage device is one of at least three different types, comprising a first type of battery which is an NiMH battery and at least two other types of batteries which are a second type of battery and a third type of battery; and
    the control circuit is further configured to detect an electrical characteristic of the thermistor in the energy storage device when present based on the electrical connection through the sensor connector of the energy storage interface, and configured to identify whether the energy storage device has a second type of battery or a third type of battery from the detected electrical characteristic of the thermistor.

3. The LED converter for an emergency lighting unit according to claim 1, wherein:
    each set of energy storage management parameters further includes at least one of discharging parameters and failure parameters.

4. The LED converter for an emergency lighting unit according to claim 1, wherein:
    the energy storage device is one of at least three different types, comprising first type of battery which is an NiMH battery and at least two other types of batteries which are a second type of battery and a third type of battery; and
    the control circuit is configured to detect whether the thermistor in the energy storage device when present is of a PTC type or NTC type, and identifies the energy storage device as having a second type of battery when the thermistor is a PTC type and a third type of battery when the thermistor is and NTC type.

5. The LED converter for an emergency lighting unit according to claim 1 further comprising a resistor connected between the sensor connector and a supply voltage line connected to the control circuit, such that the input to the control circuit from the sensor connector from a voltage divider between the resistor and the thermistor when present.

6. The LED converter for an emergency lighting unit according to claim 1 wherein the second type of battery is an Li-ion battery.

7. The LED converter for an emergency lighting unit according to claim 2 wherein the second type of battery is an Li-ion battery.

8. The LED converter for an emergency lighting unit according to claim 4 wherein the second or third type of battery is an Li-ion battery.

* * * * *